Figure 1:
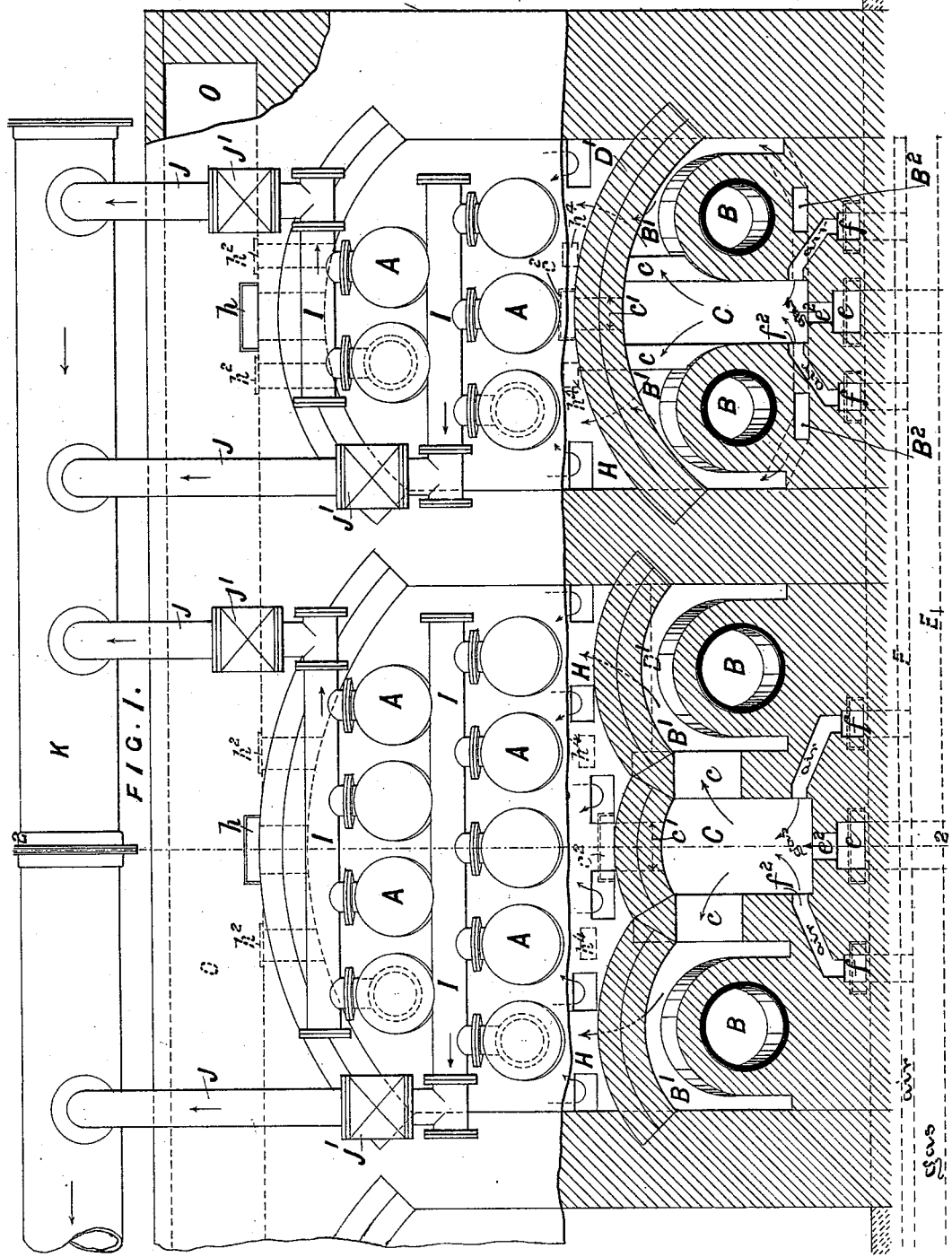

(No Model.) 3 Sheets—Sheet 1.

W. R. HERRING.
APPARATUS FOR MANUFACTURING OIL GAS.

No. 547,786. Patented Oct. 15, 1895.

Witnesses:
Geo. E. Morss
L. M. Wachschlager

Inventor
Walter R. Herring,
By Briesen & Knauth
his Attorneys.

(No Model.) 3 Sheets—Sheet 2.

W. R. HERRING.
APPARATUS FOR MANUFACTURING OIL GAS.

No. 547,786. Patented Oct. 15, 1895.

(No Model.) 3 Sheets—Sheet 3.
W. R. HERRING.
APPARATUS FOR MANUFACTURING OIL GAS.

No. 547,786. Patented Oct. 15, 1895.

UNITED STATES PATENT OFFICE.

WALTER RALPH HERRING, OF HUDDERSFIELD, ENGLAND.

APPARATUS FOR MANUFACTURING OIL-GAS.

SPECIFICATION forming part of Letters Patent No. 547,786, dated October 15, 1895.

Application filed January 16, 1895. Serial No. 535,057. (No model.)

*To all whom it may concern:*

Be it known that I, WALTER RALPH HERRING, engineer of the Corporation Gas Works, Leeds Road, Huddersfield, in the county of York, England, have invented new and useful Improvements in Apparatus for Manufacturing Oil-Gas, of which the following is a full, clear, and exact description.

My invention relates to an improved apparatus for producing a permanent oil-gas of high illuminating quality by the destructive distillation of crude mineral oils, coal-tar, or other liquid hydrocarbons.

My invention is based on the fact that the degree of heat suitable for the operation depends upon the specific gravity of the oil and that the specific gravity of the oil increases as the distillation progresses, so that the heat which is suitable at the commencement of the distillation is insufficient for the continuance of the distillation through its subsequent stages.

The invention consists in an apparatus for effecting a methodical and systematic subjection of the liquid hydrocarbon to a progressively-increasing heat as it flows through the retort or series of retorts, so that as the specific gravity of the oil increases so will the temperature at which the distillation is continued and completed.

The apparatus may be variously arranged so as to produce the required systematic flow in inverse directions of the oil undergoing distillation and of the furnace-gases by which the heating of the retorts is effected; but the preferred arrangement comprises two or more superposed series of oppositely-inclined retorts, the oil flowing through the upper retorts and thence to and through the lower retorts. The retorts of the lower bench, in which the ultimate distillation and final carbonization of the heavier oil left after the distillation in the upper retorts is effected, receive the first heat of the furnace near their lower ends and are set beneath an arch, through which the gases from the furnace flow toward the upper end, where they pass up into the flues for heating the upper retorts. The retorts of the lower bench are of larger area than those of the upper bench and are intermittent in operation and provided with means for the periodical drawing of the residual carbon. They have independent ascension-pipes connected to their upper ends for carrying off the gaseous products of distillation. The heating-chamber in which the upper retorts are set is divided by transverse walls into flues, communicating with each other alternately at top and bottom in zigzag order, through which the furnace-gases pass, provision being also made for the admission of air to any of the flues independently for regulating the temperature as may be required, these flues having the effect of heating different sections of the length of the upper retorts to different temperatures, the temperatures of successive sections diminishing by well-defined steps from the lower to the upper ends of said retorts. The oil is fed in at the upper ends of the retorts, so that as the stream of oil descends and becomes partially distilled in its progress it is subjected to progressively and suddenly increasing temperatures, the increase in temperature being approximately proportional to the increase in the specific gravity of the oil consequent on the partial distillation it has already undergone in its descent through the retort. The gases of distillation are conducted away through ascension-pipes connected to the upper ends of the retorts, any condensed products passing along with the undistilled oil to the lower retorts. The upper retorts may be continuous in their operation, as the distillation therein effected consists only in the gasification of the more volatile constituents of the oil under treatment and is not carried to such a point as to leave a solid residue, which would require periodical removal. This is, however, the case with the lower retorts, and therefore for every set of the upper retorts it would be necessary to provide duplicate sets of lower retorts and means for bringing the one set into operation while the other set is being drawn.

The apparatus for carrying my improved method of oil-gas manufacture into practice is illustrated in the accompanying drawings, wherein—

Figure 2:
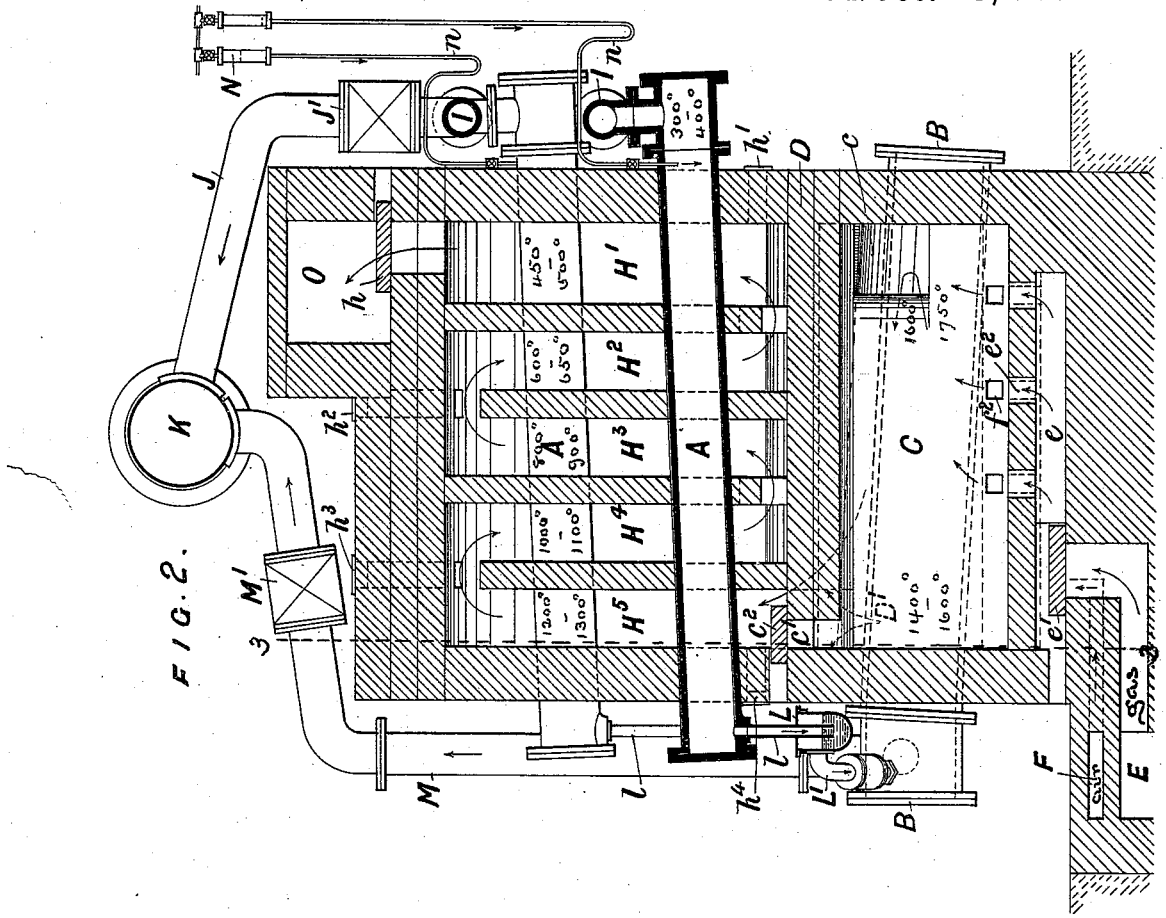
Figure 3:
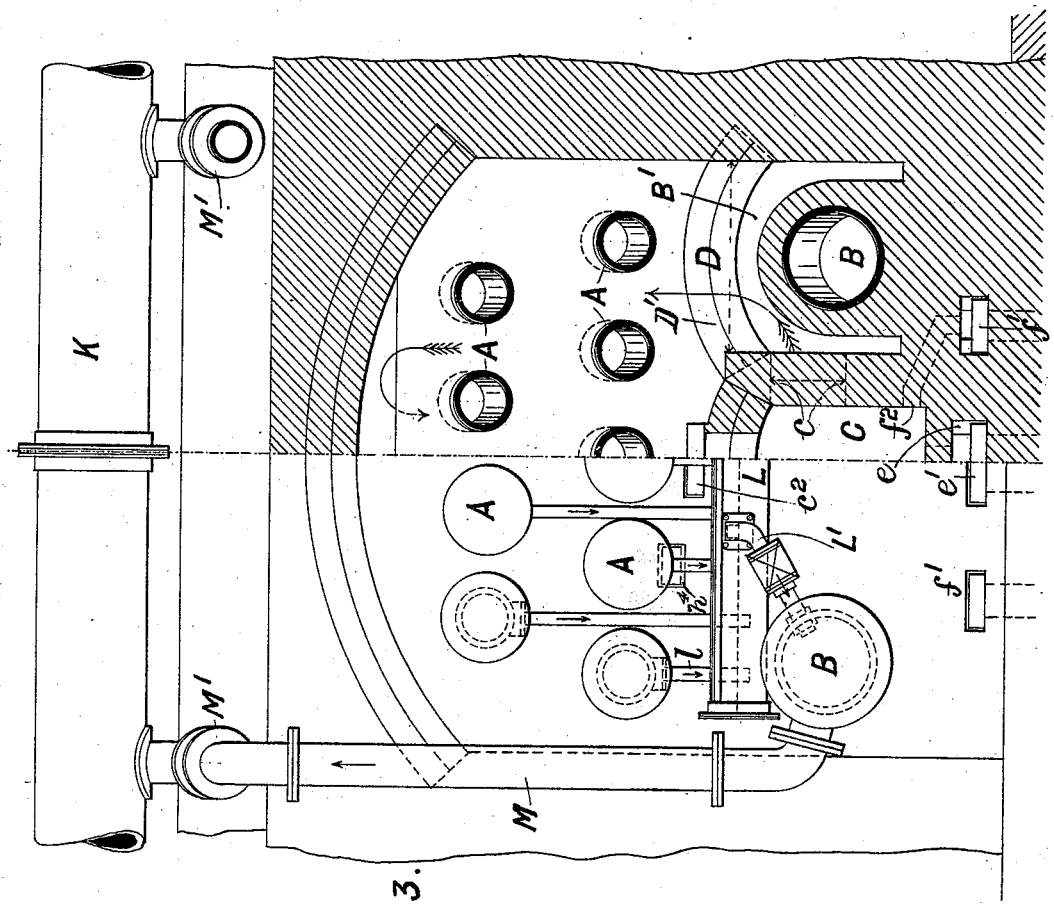

Figure 1 represents a front elevation, partly in section, illustrating two arrangements, differing only in the number of the upper retorts and in the structural details consequent on the greater width of the bench. Fig. 2 is a vertical section on line 2 2, Fig. 1. Fig. 3 is a part elevation of the back of the retort-bench and a half-vertical section on line 3 3 of Fig. 2.

In the figures, A represents the upper and

B the lower retorts, the former being inclined downward from front to back, and the latter inclined downward from back to front. The retorts B are placed at either side of a combustion-chamber C and beneath an arch D, separating the heating-flues of the lower from those of the upper retorts. The retorts B are surrounded with fire-brick in order to protect them from the direct action of the furnace-gases and by storing up heat to maintain the retorts B at a uniform temperature. The chamber C is supplied with producer-gas from a main flue E, leading from a gas-producer and communicating with a flue $e$ under the control of a damper $e'$, which is shown in the closed position, but is normally open, the gas entering chamber C through apertures $e^2$ in the floor. The chamber C is also supplied with hot air from a flue F', communicating with similar flues $f$ at either side under the control of dampers $f'$, which are also normally open, the air entering the chamber C through apertures $f^2$ in the side walls directly opposite the gas-inlet apertures $e^2$, in order to insure immediate and perfect combustion of the gases.

The combustion-chamber C communicates by apertures $c$ in the sides of chamber C at the front end with the flues B', in which the retorts B are placed, and these flues communicate at the opposite end by apertures D' in the arch D with the first flue $H^5$ of the series $H^5$ $H^4$ $H^3$ $H^2$ $H'$ above, the gases of combustion flowing along the flues B' from the lower to the higher end of the retorts B, and thence through D' into the flue $H^5$ and through the other flues $H^4$ $H^3$ $H^2$ $H'$, by which the upper retorts A are heated. An aperture $c'$ is also provided in the part of arch D, which forms the top of the chamber C, which aperture is normally closed by a damper $c$, but may be opened more or less when required to allow part of the gases of combustion to pass direct from chamber C into the flues $H^5$ $H^4$ $H^3$ $H^2$ $H'$ without passing through B'.

$B^2$ represents additional flues which may, if required, be formed in the brickwork beneath the retorts B, said flues communicating at one end with chamber C and at the other with the flues B'.

The retorts A are set in transverse walls, which divide the heating-chamber above the arch D into a series of zigzag flues $H^5$ $H^4$ $H^3$ $H^2$ $H'$, through which the gases of combustion pass in the direction of the arrows to the outlet-flue O, the draft being regulated by a damper $h$, which is normally open, and the temperature in each of the flues $H^5$ $H^4$ $H^3$ $H^2$ $H'$, and consequently in each section of the retorts A, being further controlled, if necessary, by the admission of cold air to successive portions of the flues independently, as at $h'$, $h^2$, $h^3$, and $h^4$. The retorts A are arranged in two or more tiers, those of each tier being connected at their front or higher ends with a cross collecting-pipe I, which is in turn connected by an ascension-pipe J, provided with a stop-valve J', with a condensing-main K. From the lower ends of the retorts A dip-pipes $l$ descend into a hydraulic main or trough L, common to both tiers of retorts A, which receives the undecomposed oil therefrom, and whence it overflows through pipe L' into the upper end of one or other of the retorts B, a valve being provided to close the communication with the retort, which is for the time being not in operation. The retorts B communicate at their upper ends with ascension-pipes M, provided with stop-valves M' and leading into the under side of the overhead condensing-main K, so that any oil condensed in the latter will flow back to the retorts B and be again subjected to distillation along with the oil coming from the retorts A. The oil is fed to each of the retorts A, preferably, through a siphon-pipe $n$, supplied from a sight-feed glass N, the pipe $n$ entering the retort near the upper end and discharging the oil into a semicylindrical sheet-iron scoop or tray (not shown) forming a removable liner for the lower side of the retort, the scoop extending nearly the whole length of the retort, and having for its object to receive any carbon deposited in the retort and enable it to be readily withdrawn, such a scoop or liner being placed in each of the retorts both of the upper and lower series A and B. As the oil flows down the retorts A, it passes through successive regions of progressively-increasing temperatures, these regions corresponding to the successive portions $H'$ $H^2$ $H^3$ $H^4$ $H^5$ of the zigzag flue, the gases distilled off passing in the opposite direction and any imperfectly-gasified vapors being converted into permanent gas in passing through the next lower heat zone or zones of the retorts. The oil remaining undistilled in the retorts A passes thence through the hydraulic main L to the lower retorts B, where it is again subjected to distillation at progressively-higher degrees of temperature until the whole of the oil is distilled and converted into permanent gas, which passes off, and carbon, which deposits in the scoop or liner of the retort. No purification of the gas is needed unless the oil distilled contains impurities—such as, for example, compounds of sulphur. The carbon deposited in the retorts is very small in comparison with that resulting from the methods heretofore practiced, being not more than about one-fifth of that produced by the best known methods. This result I ascribe to the fact that the gasification of the oil is effected in a single and practically continuous operation by means of an apparatus wherein the oil is subjected to fractional distillation at different temperatures, which increase in a methodical and progressive manner proportionately to the increase of the specific gravity of the oil as the distillation proceeds, no more oil being introduced than can be wholly gasified in one continuous operation, and no washing of the gas with the oil or contact with oil-saturated surfaces, and the consequent absorption by the oil of valuable constituents of the gas being permitted.

I am aware that it has been proposed to distil or crack and gasify hydrocarbon oils and the like by subjecting the same to distillation at one temperature and the deposited products of fractional condensation to redistillation at different temperatures corresponding to their specific gravities; but this method involves waste of heat and consequently of fuel by the alternate distillation and condensation of the oil, and no adequate means existed of regulating the temperature of the retorts, according to the specific gravity of the products of the first distillation of the oil, whereas by the arrangement of the flues, dampers, and cold-air inlets herein described and illustrated in the drawings I am enabled to obtain the most complete control of the operation in both sets of retorts and to maintain in the same retorts well-defined regions of progressively-varying temperature corresponding to the specific gravity of the oil in the different stages of distillation.

I will proceed to give an example of the actual results, as regards control of temperature, obtained in apparatus such as herein described and illustrated with special reference to Fig. 2 of the accompanying drawings, the grades of temperature indicated in the appended tabular statement being those suited to successive stages in the continuous fractional distillation of an oil having an initial specific gravity of from 870° to 880°.

| | Degrees, Fahrenheit. | |
|---|---|---|
| | From— | To— |
| Temperature of retorts A at point where oil enters | 300 | 400 |
| Temperature of that section of retorts A which lies in flue H' | 450 | 500 |
| Temperature of that section of retorts A which lies in flue H² | 600 | 650 |
| Temperature of that section of retorts A which lies in flue H³ | 800 | 900 |
| Temperature of that section of retorts A which lies in flue H⁴ | 1,000 | 1,100 |
| Temperature of that section of retorts A which lies in flue H⁵ | 1,200 | 1,300 |
| Temperature in upper end of retort B | 1,400 | 1,600 |
| Temperature in lower end of retort B | 1,600 | 1,750 |

I wish it to be clearly understood that I do not confine myself to the use of the precise number or proportionate dimensions of the flues or retorts or other portions of the herein described and illustrated apparatus, it being obvious that with certain classes of oils it might be advantageous to vary, for example, either the number of compartments of the zigzag flues H or the proportionate width of some or all of those compartments or (with a view to altering the speed of flow of the oil) the angle of inclination at which any tier of the retorts is set.

I claim—

1. The apparatus for carrying out the herein described process of destructive distillation of oil, tar, and other liquid hydrocarbon, the said apparatus consisting essentially of inclined straight retorts, a series of vertical flues across which the retorts extend, the said flues being connected to each other in zig-zag order so as to cause the furnace gases heated to different temperatures to strike each retort transversely and repeatedly at succeeding points so as to produce therein successive regions of progressive and suddenly varying temperature, substantially as herein described and illustrated in the drawings.

2. The apparatus for carrying out the herein described process of destructive distillation of oil, tar, and other liquid hydrocarbon, consisting in the combination of an upper series of inclined straight retorts, a series of vertical flues extending across the retorts and connected in zig-zag order so as to repeatedly cross the retorts transversely and provided with cold air inlets to each member of the zig-zag flue, a lower set of retorts reversely inclined to the upper set, the lower set being in duplicate and put alternately in communication with the upper set for the passage of the heavy oil left in the upper retorts to the one or other of the lower retorts, the lower retorts having separate ascension pipes for the gas and being set in flues extending lengthwise of the retort and communicating at one end with the furnace and at the other end with the first of the series of zig-zag flues of the upper retorts, and means substantially as described for causing the furnace gases to pass through the flues of the lower retorts alternately, substantially as specified.

WALTER RALPH HERRING.

In presence of—
G. F. WARREN,
T. F. BARNES.